United States Patent [19]

MacLean

[11] 3,736,530

[45] May 29, 1973

[54] ADJUSTABLE EQUALIZER CONTROL APPARATUS

[75] Inventor: Roderick Campbell MacLean, Atkinson, N.H.

[73] Assignee: Bell Telephone Laboratories, Incorporated, Murray Hill, N.J.

[22] Filed: Feb. 22, 1972

[21] Appl. No.: 227,740

[52] U.S. Cl. ....................333/18, 325/65

[51] Int. Cl. ....................H04b 3/04

[58] Field of Search ....................333/18, 28 R, 70 T; 325/42, 65

[56] References Cited

UNITED STATES PATENTS

| | | | |
|---|---|---|---|
| 3,366,895 | 1/1968 | Lucky | 333/18 |
| 3,573,667 | 4/1971 | Kao et al. | 333/18 |
| 3,633,129 | 1/1972 | Kao et al. | 333/18 |
| 3,651,316 | 3/1972 | Gibson | 333/18 X |

*Primary Examiner*—Paul L. Gensler
*Attorney*—R. J. Guenther and William L. Keefauver

[57] ABSTRACT

In apparatus for controlling the several sections of an adjustable bump equalizer in a transmission system, the effectiveness of each equalizer section is determined directly each time the equalizer is to be adjusted by measuring the sensitivity of the equalizer frequency response to a small change in the control signal for each section. This sensitivity information is used in the processing of other signal information indicative of the misalignment of the transmission system to produce signals suitable for adjusting the equalizer to reduce transmission system misalignment.

19 Claims, 1 Drawing Figure

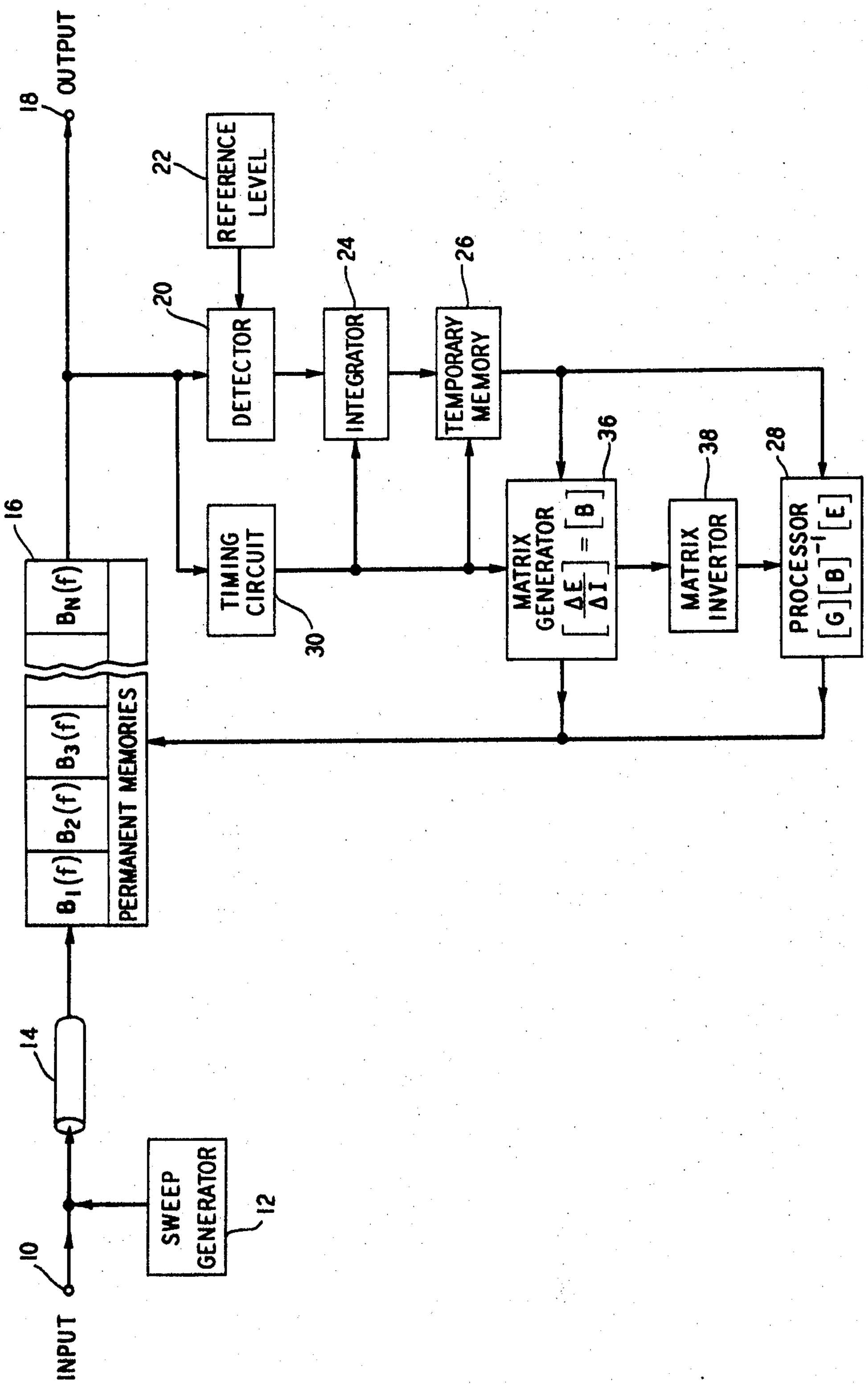
INPUT
10
SWEEP GENERATOR
12
14
16
$B_1(f)$
$B_2(f)$
$B_3(f)$
$B_N(f)$
PERMANENT MEMORIES
18
OUTPUT
20
DETECTOR
22
REFERENCE LEVEL
24
INTEGRATOR
26
TEMPORARY MEMORY
TIMING CIRCUIT
30
MATRIX GENERATOR
$\left[\frac{\Delta E}{\Delta I}\right] = [B]$
36
MATRIX INVERTOR
38
PROCESSOR
$[G][B]^{-1}[E]$
28

ADJUSTABLE EQUALIZER CONTROL APPARATUS

BACKGROUND OF THE INVENTION

1. Field of the Invention

This invention relates to analog signal transmission systems and more particularly to automatic equalization in wide-band, analog communications systems.

2. Description of the Prior Art

In my contemporaneously filed patent application, Ser. No. 227,741, I have described apparatus for use in conjunction with equalizer control apparatus of the type which employs information regarding the sensitivity of the controlled equalizer. In accordance with the principles of that invention, a memory is provided for storing a characterization of the sensitivity of each section of an adjustable bump equalizer as a function of the equalizer control signal or quantity controlling that section. The information stored in this memory is accessed on the basis of the present values of the equalizer control quantities to produce information representative of the sensitivity of the equalizer at its present setting. This information is used in the processing of other signal information representative of the misalignment of the transmission system served by the equalizer to produce control quantities for adjusting the equalizer to reduce system misalignment.

Three specific examples of adjustable equalizer control systems adaptable for modification in accordance with these principles are mentioned in the above application. These are a system proposed by R. W. Ketchledge in "The L3 Coaxial System: Equalization and Regulation" (*Bell System Technical Journal*, Vol. 32, No. 4, July 1953, pp. 833–878 particularly pp. 842–851) and two systems disclosed by C. Kao in concurrently filed applications, Ser. No. 227,739 and Ser. No. 228,079. In the Ketchledge system pilot signals are used to measure transmission system misalignment, while in the two Kao systems a test sweep signal is used to measure misalignment.

While the apparatus disclosed in my above-cited copending application Ser. No. 227,741 accounts for nonlinearities in the equalizer control relationships, the equalizer characterization stored in the memory must be predetermined from the design and behavior of the equalizer. In fact, however, the characteristics of equalizer devices are subject to change as ambient conditions change and as the apparatus ages. Thus no stored equalizer characterization can be completely accurate.

It is therefore an object of this invention to improve automatic equalization in analog communications systems.

It is another object of this invention to provide adjustable equalizer control apparatus in which the effectiveness of each equalizer section is determined directly each time the equalizer is to be adjusted.

It is still another object of this invention to provide apparatus for controlling an adjustable equalizer by solving a system or set of simultaneous equations relating equalizer misalignment to the effectiveness of each equalizer section, wherein the effectiveness of each equalizer section is determined directly each time the equalizer is to be adjusted.

SUMMARY OF THE INVENTION

These and other objects of this invention are accomplished, in accordance with the principles of the invention, by adjustable equalizer control apparatus in which the sensitivity of each section of the equalizer to a small change in the equalizer control quantity controlling that section is determined directly each time the equalizer is to be adjusted. This is accomplished by incrementing each equalizer control quantity in turn and comparing the transmission characteristic of the system before incrementation to the transmission characteristic after incrementation. The sensitivity information thus generated is used in the processing of signals indicative of the misalignment of the transmission system to produce control signals for incrementally adjusting the sections of the equalizer to reduce that misalignment.

Further features and objects of this invention, its nature, and various advantages, will be more apparent upon consideration of the attached drawing and the following detailed description.

BRIEF DESCRIPTION OF THE DRAWING

The single FIGURE of the drawing is a block diagram of an illustrative embodiment of adjustable equalizer control apparatus constructed in accordance with the principles of this invention.

DETAILED DESCRIPTION OF THE INVENTION

Like the apparatus disclosed in my above-cited copending application Ser. No. 227,741, the principles of this invention are applicable to a wide variety of adjustable equalizer control strategies which rely on a precise characterization of the equalizer to be controlled. Particularly suitable for modification in accordance with the principles of this invention are equalizer control systems of the type described by Ketchledge et al and Kao in the above-cited references. The invention will be fully understood, however, from a detailed discussion of its application to the system disclosed in the first of the above-cited applications of C. Kao.

Referring to the FIGURE, the operation of the Kao system may be briefly summarized as follows: When the transmission system apparatus including cable 14 and equalizer 16 requires realignment, that apparatus is disconnected at terminals 10 and 18. A test sweep signal having frequency varying monotonically across the transmission band of the system is generated by sweep generator 12 and applied to the transmission line. The amplitude of this signal as transmitted by the system is compared by detector 20 to a reference signal level supplied by reference source 22. This comparison is made for all frequencies in the test sweep signal to produce a signal progressively representative of the misalignment of the system at all frequencies in the transmission band. Integrator 24, responsive to control signals generated by timing circuit 30, integrates this misalignment signal over N separate frequency ranges in the transmission band to produce N integral misalignment quantities, each of which is applied to temporary memory 26. Memory 26 may be any suitable analog or digital memory as, for example, a flip-flop register. At the completion of the test sweep, temporary memory 26 contains a vector E comprised of of N quantities, each representative of the misalignment of the system integrated over a predetermined frequency range in the transmission band of the system.

This vector of misalignment quantities is multiplied in processor 28 by the inverse of a matrix B (described below) and by a diagonal gain control matrix G to produce a vector of N incremental equalizer adjustment quantities, one for each section of equalizer 16 to be adjusted. These incremental adjustment quantities are added to the N equalizer control quantities stored in the permanent memories of equalizer 16. The permanent memory may be any suitable analog or digital memory. For example, the memory may comprise flip-flop registers. Responsive to the changed control quantities, the N sections of equalizer 16 readjust to reduce the misalignment of the system.

The matrix B required in the above-described equalizer control apparatus is a characterization of the sensitivity of each equalizer section in each frequency range for which misalignment has been determined. In the system as disclosed by Kao application Ser. No. 227,739, this matrix is determined in advance and its inverse is stored in processor 28. In the modified system described in my above-cited copending application ser. No. 227,741, this matrix is determined each time the equalizer is to be adjusted by accessing a memory in which a data constituting a characterization of the sensitivity of each equalizer section as a function of the quantity controlling it is stored. This memory is accessed on the basis of the present values of the N equalizer control quantities. In equalizer control apparatus constructed in accordance with the principles of the instant invention this matrix is determined directly from the characteristics of the equalizer each time the equalizer is to be adjusted. This is accomplished as discussed in detail below.

After the N elements of vector E have been determined and stored in temporary memory 26 but before processing by processor 28, matrix generator 36 increments the control quantity controlling one of the sections (preferably the first) of equalizer 16 by a predetermined amount ΔI. Sweep generator 12 then generates another sweep signal of the type described above. All of devices 20, 22, 24, 26, and 30 repeat the functions described above to generate a second vector of N integral misalignment quantities also store in stored memory 26. Since this second vector represents the misalignment of the system with one equalizer control quantity incremented by ΔI, it may be conveniently referred to as an incremented integral misalignment vector. Both the original vector E and this incremented integral misalignment vector are applied to matrix generator 36. Matrix generator 36 subtracts the corresponding elements in each of these vectors and divides each difference, ΔE, by ΔI. Each of the N resulting quotients is a direct measurement of the sensitivity of the transmission system in a predetermined frequency range to a change in the quantity controlling a predetermined section of equalizer 16. These quantities are stored in matrix generator 36. Matrix generator 36 then restores the incremented equalizer control quantity to its original value. Matrix generator 36 may be any analog or digital apparatus capable of performing the required control, storage and arithmetic operations, e.g., a suitably programmed digital computer.

Assuming the control quantity for the first equalizer section to have been the one incremented, the N quotients generated as discussed above form the elements in the first column of the matrix B required in the control apparatus disclosed in the first of the above-cited applications of C. Kao. In accordance with the principles of this invention, however, these elements of matrix B have been directly determined from the behavior of the system.

The above-described operations are repeated for each of the N sections of equalizer 16 in turn until all N columns of sensitivity matrix B have been generated by and stored in matrix generator 36. It will be evident that a total of N+1 test sweep signals are required in the course of generating matrix B: one to generate the original vector E and N to generate N incremented integral misalignment vectors, each of which must be compared to reference vector E as described above.

When the entire matrix B has been determined, it is applied to matrix invertor 38 which algebraically manipulates the elements of the matrix to compute its inverse, $[B]^{-1}$. Matrix invertor 38 may therefore be any apparatus capable of computing the inverse of an applied matrix, e.g., any suitably programmed digital computing machinery. Programming techniques for matrix inversion are discussed, for example, in Chapter 5 of *Introduction to Numerical Methods and FORTRAN Programming* by T. R. McCalla (John Wiley & Sons, Inc., 1967).

The inverse of matrix B, computed by matrix invertor 38, is applied to processor 28 which is then ready to process the original vector E still stored in temporary memory 26. This processing is entirely similar to that performed by the processor in the system of C. Kao reviewed above. Processor 28 may therefore be apparatus similar to the processor in the Kao system. As in the Kao system, N incremental equalizer adjustment quantities are generated by processor 28 and added to the N equalizer control quantities stored in the permanent memories of equalizer 16 in the manner described above. Thereafter, the entire equalization process can be repeated as many times as necessary to achieve the desired level of equalization. Since an entirely new matrix $[B]^{-1}$ is computed from direct measurements of equalizer sensitivity each time the equalizer is to be adjusted, matrix $[B]^{-1}$ always describes the equalizer with a high degree of precision no matter how the properties of the equalizer may change. Moreover, if the adjustment of equalizer 16 is made in sufficiently small increments (as determined by diagonal gain matrix [G]) the system also compensates for nonlinearities in the control system of the type discussed in detail in my above-cited copending application Ser. No. 227,741.

It will be understood that the embodiments shown and described herein are illustrative of the principles of this invention only and that modifications can be implemented by those skilled in the art without departing from the spirit and scope of the invention. For example, all the functions of devices 26, 28, 36, and 38 can be conveniently performed in a single suitably programmed digital computer. It will also be understood that the principles of this invention are generally applicable to any adjustable equalizer control strategy which relies on a characterization of equalizer response or sensitivity. For example, the matrix B needed in the processor in the equalizer control apparatus disclosed in the second of the above-cited applications of C. Kao can be generated by apparatus similar to that discussed above. Similarly, the equalizer control apparatus discussed by Ketchledge et al is adaptable to modification in accordance with the principles of this invention.

What is claimed is:

1. In a communications transmission system, improved adjustable equalizer control apparatus including means for processing signals indicative of the misalignment of the transmission system in accordance with a characterization of the effectiveness of each equalizer section to produce signals for controlling the several sections of the equalizer to reduce misalignment, wherein the improvement comprises:

means for determining the initial misalignment of the transmission system;

means for sequentially adjusting each of the sections of the equalizer by a predetermined incremental amount;

means for determining the misalignment of the transmission system after incremental adjustment of each equalizer section; and means for comparing the misalignment of the transmission system after incremental adjustment of each equalizer section to the initial misalignment to produce said characterization of the effectiveness of each equalizer section.

2. Apparatus for controlling the several sections of an adjustable equalizer, said equalizer being responsive to the output signals of a transmission system transmission line, comprising:

means for incrementally adjusting each section of the equalizer;

means for comparing the misalignment of said transmission system before and after incremental adjustment of each equalizer section to produce a characterization of the effectiveness of each equalizer section; and means for processing signals indicative of the misalignment of said transmission system in accordance with said characterization of effectiveness to produce signals for controlling said equalizer sections to reduce said misalignment.

3. Apparatus for controlling the frequency response levels of the several sections of an adjustable bump equalizer, said equalizer being responsive to the output signals of a transmission system transmission line, comprising:

means for generating signals representative of the misalignment of said transmission system;

means for incrementally adjusting the frequency response level of each section of the equalizer;

means for comparing the misalignment of said equalizer before and after incremental adjustment of each equalizer section to produce signals representative of the effectiveness of each equalizer section; and means responsive to said signals representative of effectiveness for processing said signals representative of the misalignment of said transmission system to produce signals for controlling the frequency response levels of said equalizer sections to reduce said misalignment.

4. Apparatus for generating signals for controlling the frequency response level of each of the several sections of an adjustable bump equalizer, said equalizer being responsive to the output signals of a transmission system transmission line, comprising:

means for generating signals representative of the misalignment of said transmission system;

means for incrementally altering the signal controlling each section of the equalizer;

means for comparing the misalignment of said equalizer before and after alteration of each equalizer section to produce signals representative of the sensitivity of the frequency response of the equalizer to changes in each equalizer control signal; and means responsive to said signals representative of the sensitivity of said equalizer for processing said signals representative of said misalignment to produce signals for controlling the frequency response level of each of said equalizer sections to reduce said misalignment.

5. The method of controlling an adjustable equalizer having a plurality of independently adjustable equalizer sections, said equalizer being responsive to the output signals of a transmission system transmission line, comprising the steps of:

measuring the initial misalignment of the transmission system;

adjusting one of said equalizer sections by a predetermined incremental amount;

measuring the misalignment of the transmission system after incremental adjustment of said equalizer section;

comparing the misalignment of the transmission system after said incremental adjustment to said initial misalignment to determine the effectiveness of said equalizer section;

repeating the three immediately preceding steps for each of the sections of said equalizer to determine the effectiveness of each of said equalizer sections; and generating signals for adjusting said equalizer sections to reduce the misalignment of the transmission system on the basis of said initial misalignment and the effectiveness of each equalizer section.

6. The method of controlling the frequency response levels of the several sections of an adjustable bump equalizer, said equalizer being responsive to the output signals of a transmission system transmission line, comprising the steps of:

measuring the initial misalignment of said transmission system;

adjusting the frequency response level of one of said equalizer sections by a predetermined incremental amount;

measuring the misalignment of said transmission system after incremental adjustment of said equalizer section;

comparing the misalignment of said equalizer after said incremental adjustment to said initial misalignment to determine the effectiveness of said equalizer section;

repeating the three immediately preceding steps for each of the sections of said equalizer to be adjusted to determine the effectiveness of each of said equalizer sections; and processing signals representative of said initial misalignment in response to the effectiveness of each of said equalizer sections to produce signals for controlling said equalizer sections to reduce the misalignment of said transmission system.

7. Improved adjustable equalizer control apparatus in which signal quantities for controlling the several sections of an adjustable bump equalizer are generated by solving a set of simultaneous equations relating transmission system misalignment to the effectiveness of each equalizer section, wherein the improvement comprises:

means for determining the misalignment of the transmission system;

means for incrementing each of the equalizer section control quantities in turn;

means for comparing the misalignment of the transmission system before and after incrementation of each of the equalizer control quantities to generate signal information indicative of the sensitivity of the misalignment of the system to changes in each of the equalizer control quantities; and means for processing said signal information to produce a matrix of quantities needed in the solution of said set of simultaneous equations.

8. The apparatus defined in claim 7 wherein said means for determining the misalignment of the transmission system comprises:

means for applying a test signal of a predetermined amplitude to said transmission system; and means for comparing the amplitude of said test signal as transmitted by said transmission system to a predetermined reference amplitude to produce a misalignment signal.

9. The apparatus defined in claim 8 wherein said test signal is a sweep signal progressively including substantially all frequencies in the operating frequency band of said transmission system.

10. The apparatus defined in claim 9 wherein said means for determining the misalignment of the transmission system further comprises means for integrating said misalignment signal over a plurality of frequency ranges in said test sweep signal to produce a vector of integral misalignment quantities.

11. The apparatus define in claim 10 wherein said means for comparing the misalignment of the transmission system before and after incrementation of each of the equalizer control quantities comprises means for comparing the vector of integral misalignment quantities before and after incrementation of each equalizer control quantity to produce a sensitivity matrix indicative of sensitivity of the misalignment in each frequency range to change of each equalizer control quantity.

12. The apparatus defined in claim 11 wherein said means for processing comprises means for inverting said sensitivity matrix.

13. The apparatus defined in claim 12 further comprising:

means for multiplying the vector of integral misalignment quantities by the inverted sensitivity matrix to produce a vector of equalizer control quantities; and means for applying said equalizer control quantities to the several sections of said equalizer.

14. Apparatus for generating signals for controlling the frequency response levels of the several sections of an adjustable equalizer by solving a set of simultaneous equations relating transmission system misalignment to the effectiveness of each equalizer section in each of a plurality of frequency ranges in the transmission band of the system comprising:

means for determining the misalignment of the transmission system in each of said frequency ranges;

means for altering each of said control signals by a predetermined incremental amount;

means for comparing the misalignment of the transmission system in each of said frequency ranges before and after alteration of each of said control signals to produce signals indicative of the effectiveness of each equalizer section in each of said frequency ranges; and means responsive to said means for determining and said means for comparing for solving said set of simultaneous equations to produce said control signals for reducing said misalignment.

15. Apparatus for generating signals for controlling the frequency response levels of the several sections of an adjustable equalizer by solving a set of simultaneous equations relating transmission system misalignment to the effectiveness of each equalizer section in each of a plurality of frequency ranges in the transmission band of the system comprising:

means for generating signals representative of the misalignment of the transmission system in each of said frequency ranges;

means for altering each of said control signals by a predetermined incremental amount;

means for comparing the signals representative of the misalignment of the transmission system in each of said frequency ranges before and after alteration of each of said control signals to produce signals indicative of the effectiveness of each equalizer section in each of said frequency ranges; and means responsive to said misalignment and effectiveness signals for solving said set of simultaneous equations to produce said control signals for reducing said misalignment.

16. The apparatus defined in claim 15 wherein said means for generating misalignment signals comprises:

means for applying test signals of a predetermined amplitude to said transmission system; and means for comparing the amplitude of said test signals as transmitted by said transmission system to a predetermined reference amplitude to produce said misalignment signals.

17. The apparatus defined in claim 15 wherein said means for generating misalignment signals comprises:

means for applying a test sweep signal of a predetermined amplitude to said transmission system, said test sweep signal having frequency varying monotonically for all frequencies in the transmission band of the system;

means for comparing the amplitude of said test sweep signal as transmitted by said transmission system to a predetermined reference amplitude to produce an error signal; and means responsive to the frequency of said test sweep signal for integrating said error signal for each of said frequency ranges occurring in said test sweep signal to produce a plurality of misalignment signal quantities.

18. The apparatus defined in claim 17 wherein said means for comparing the signals representative of the misalignment of the transmission system in each of said frequency ranges before and after alteration of each of said control signals comprises means for comparing the plurality of misalignment signal quantities before and after alteration of each of said control signals to produce a matrix of quantities indicative of the effectiveness of each equalizer section in each frequency range.

19. The apparatus defined in claim 18 wherein said means for solving comprises:

means for inverting said effectiveness matrix; and means for multiplying the plurality of misalignment signal quantities by said inverted effectiveness matrix to produce said control signals for reducing said misalignment.

* * * * *